(12) United States Patent
Sukonik et al.

(10) Patent No.: US 7,304,999 B2
(45) Date of Patent: Dec. 4, 2007

(54) METHODS AND APPARATUS FOR PROCESSING PACKETS INCLUDING DISTRIBUTING PACKETS ACROSS MULTIPLE PACKET PROCESSING ENGINES AND GATHERING THE PROCESSED PACKETS FROM THE PROCESSING ENGINES

(75) Inventors: Vitaly Sukonik, Katsir (IL); Michael Laor, Zichron-Yakov (IL); Michael B. Galles, Los Altos, CA (US); Moshe Voloshin, Cupertino, CA (US); William N. Eatherton, San Jose, CA (US); Rami Zemach, Herzeliya (IL); John H. W. Bettink, San Jose, CA (US)

(73) Assignee: Cisco Technology Inc., San Jose, CA (US)

( * ) Notice: Subject to any disclaimer, the term of this patent is extended or adjusted under 35 U.S.C. 154(b) by 972 days.

(21) Appl. No.: 10/227,119

(22) Filed: Aug. 24, 2002

(65) Prior Publication Data

US 2004/0037322 A1 Feb. 26, 2004

(51) Int. Cl.
*H04L 12/56* (2006.01)

(52) U.S. Cl. .................................... 370/396; 370/412

(58) Field of Classification Search ............. 370/395.1, 370/389, 392, 394, 390, 352–358, 395.5, 370/401, 402, 428, 535, 391, 396, 386, 412, 370/411, 429, 265
See application file for complete search history.

(56) References Cited

U.S. PATENT DOCUMENTS

| | | | |
|---|---|---|---|
| 4,491,945 A | 1/1985 | Turner | |
| 4,494,230 A | 1/1985 | Turner | |
| 4,630,260 A | 12/1986 | Toy et al. | |

(Continued)

FOREIGN PATENT DOCUMENTS

| | | |
|---|---|---|
| EP | 1 085 723 | 3/2001 |
| WO | WO 02/09307 | 1/2002 |
| WO | WO 02/39667 | 5/2002 |

OTHER PUBLICATIONS

Jonathan S. Turner, "An Optimal Nonblocking Multicast Virtual Circuit Switch," Jun. 1994, Proceedings of Infocom, 8 pages.

(Continued)

*Primary Examiner*—Brenda Pham
(74) *Attorney, Agent, or Firm*—The Law Office of Kirk D. Williams

(57) ABSTRACT

Methods and apparatus are disclosed for processing packets, for example, using a high performance massively parallel packet processing architecture, distributing packets or subsets thereof to individual packet processors and gathering the processed packet or subsets and forwarding the resultant modified or otherwise processed packets, accessing packet processing resources across a shared resource network, accessing packet processing resources using direct memory access techniques, and/or storing one overlapping portion of a packet in a global packet memory while providing a second overlapping portion to a packet processor. In one implementation, a packet of multiple streams of packets is received. A subset of bytes of the packet are distributed to the next packet processor determined based on a distribution pattern. The subset of the packet is processed to generate a modified subset, which is gathered in turn based on the distribution pattern; and a modified packet including the modified subset is forwarded.

34 Claims, 12 Drawing Sheets

U.S. PATENT DOCUMENTS

| | | | |
|---|---|---|---|
| 4,734,907 A | | 3/1988 | Turner |
| 4,755,986 A | * | 7/1988 | Hirata .................. 370/392 |
| 4,829,227 A | | 5/1989 | Turner |
| 4,849,968 A | | 7/1989 | Turner |
| 4,893,304 A | | 1/1990 | Giacopelli et al. |
| 4,901,309 A | | 2/1990 | Turner |
| 5,127,000 A | | 6/1992 | Henrion |
| 5,173,897 A | | 12/1992 | Schrodi et al. |
| 5,179,551 A | | 1/1993 | Turner |
| 5,179,556 A | | 1/1993 | Turner |
| 5,229,991 A | | 7/1993 | Turner |
| 5,253,251 A | | 10/1993 | Aramaki |
| 5,260,935 A | | 11/1993 | Turner |
| 5,339,311 A | | 8/1994 | Turner |
| 5,402,415 A | | 3/1995 | Turner |
| 5,450,411 A | * | 9/1995 | Heil .................. 370/352 |
| 5,842,040 A | | 11/1998 | Hughes et al. |
| 5,896,501 A | * | 4/1999 | Ikeda et al. .................. 709/216 |
| 5,905,725 A | | 5/1999 | Sindhu et al. |
| 5,949,780 A | | 9/1999 | Gopinath |
| 6,032,190 A | | 2/2000 | Bremer et al. |
| 6,128,666 A | * | 10/2000 | Muller et al. .................. 709/238 |
| 7,093,027 B1 | | 8/2006 | Shabtay et al. |
| 2001/0049744 A1 | | 12/2001 | Hussey et al. |
| 2004/0039787 A1 | | 2/2004 | Zemach et al. |

OTHER PUBLICATIONS

Chaney et al., "Design of a Gigabit ATM Switch," Feb. 5, 1996, WUCS-96-07, Washington University, St. Louis, MO, 20 pages.

Turner et al., "System Architecture Document for Gigabit Switching Technology," Aug. 27, 1998, Ver. 3.5, ARL-94-11, Washington University, St. Louis, MO, 110 pages.

U.S. Appl. No. 10/227,114, filed Aug. 24, 2002, Zemach et al.

* cited by examiner

EXEMPLARY DMA
DESCRIPTOR
650

EXEMPLARY
INDICATORS
660

METHODS AND APPARATUS FOR PROCESSING PACKETS INCLUDING DISTRIBUTING PACKETS ACROSS MULTIPLE PACKET PROCESSING ENGINES AND GATHERING THE PROCESSED PACKETS FROM THE PROCESSING ENGINES

FIELD OF THE INVENTION

This invention especially relates to communications and computer systems; and more particularly, the invention relates to processing of packets such as in a router, packet switching system, or other communications or computer system; more specifically, such processing may include distributing packets or subsets thereof to individual packet processors and gathering the processed packet or subsets and forwarding the resultant modified or otherwise processed packets.

BACKGROUND OF THE INVENTION

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP).

A network device, such as a switch or router, typically receives, processes, and forwards or discards a packet based on one or more criteria, including the type of protocol used by the packet, addresses of the packet (e.g., source, destination, group), and type or quality of service requested. Additionally, one or more security operations are typically performed on each packet.

Known packet processes typically have architectures consisting of a pipeline with fixed stages of hardware resource blocks and micro-sequencers. The hardware resource blocks include functionality like parsing of packet headers based on register based configuration for packet classification and longest prefix match search. The micro-sequencers can do header modification based on results from resource blocks. This architecture strikes a balance between high performance (similar to levels of completely hardwired packet processors) and flexibility. There have been numerous tweaks made to the micro-code to support features not understood when the original ASICs were designed that would have required a re-spin if the micro-sequencers had not been included.

The primary difficulty with this architecture is that the pipeline architecture still assumes that the ordering of processing and resource accesses is mostly understood at the time of the application-specific integrated circuit (ASIC) design, and is fairly consistent across all applications. If new applications want to use resources (e.g., memories, lookup engines, or content-addressable memories) in new ways or want to more flexibly trade-off performance and features, the pipeline architecture is rigid. Additionally, the complexity of programming the pipelined engines greatly escalates with an increased number of processor stages. Also, the split packet processing functionality across the various stages of the pipelined architecture greatly constrains the packet processing capabilities. Needed are new methods and apparatus for processing packets.

SUMMARY OF THE INVENTION

Methods and apparatus are disclosed for processing packets in a router, packet switching system, or other communications or computer system. Such packet processing may include, for example, but is not limited to (nor all embodiments require) using a high performance massively parallel packet processing architecture, distributing packets or subsets thereof to individual packet processors and gathering the processed packet or subsets and forwarding the resultant modified or otherwise processed packets, accessing packet processing resources across a shared resource network, accessing packet processing resources using direct memory access techniques, and/or storing one overlapping portion of a packet in a global packet memory while providing a second overlapping portion to a packet processor.

In one embodiment, a packet belonging to one of multiple streams of packets is received. A next packet processor is determined based on a distribution pattern. A subset of bytes of the packet is distributed to the next packet processor. The subset of the packet is processed to generate a modified subset, which is gathered from the next packet processor in turn based on the distribution pattern; and a modified packet including the modified subset is forwarded. In one embodiment, a portion of the packet is placed in a global packet memory. In one embodiment, this portion and the processed subset of the packet include overlapping bytes of the packet. In one embodiment, the processing of the packet includes accessing one or more processing resources across a resource network shared by multiple packet processing engines. In one embodiment, the global packet memory is one of these resources. In one embodiment, these resources are accessed using direct memory access (DMA) techniques. In one embodiment, a packet processor can simultaneously have multiple DMA requests outstanding to the same or to different resources. In one embodiment, packet processing is performed using other methods and apparatus disclosed herein.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Figure 1A:
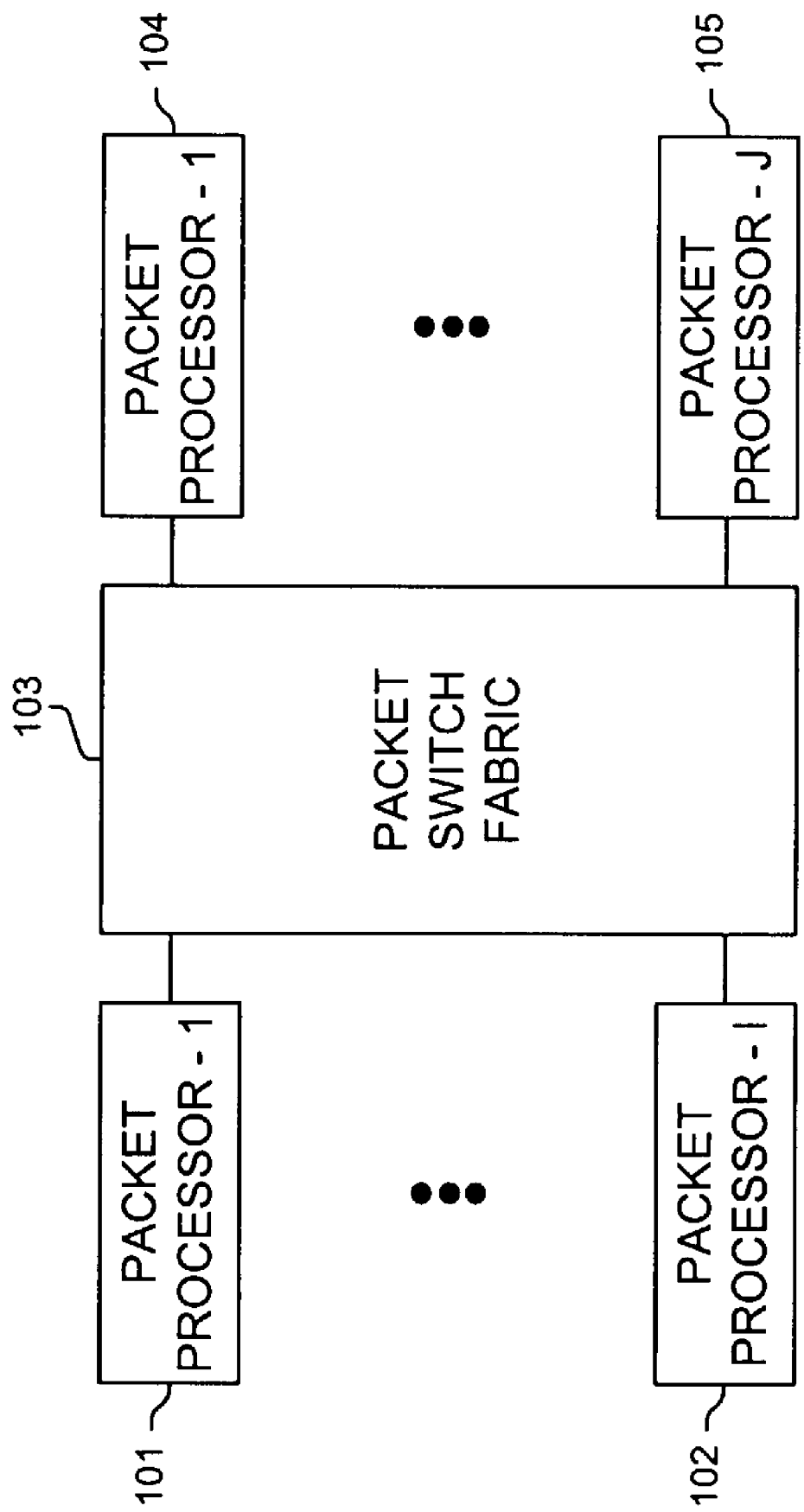
FIG. 1A is a block diagram of an exemplary system employing one embodiment of a packet processor as disclosed herein.

Methods and apparatus are disclosed for processing packet, such as in a router, packet switching system, or other communications or computer component, device, or system. Embodiments described herein include various elements and limitations, with no one element or limitation contemplated as being a critical element or limitation. Each of the claims individually recites an aspect of the invention in its entirety. Moreover, some embodiments described may include, but are not limited to, *inter alia*, systems, networks, integrated circuit chips, embedded processors, ASICs, methods, and computer-readable medium containing instructions. The embodiments described hereinafter embody various aspects and configurations within the scope and spirit of the invention, with the figures illustrating exemplary and non-limiting configurations.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to all or part of a packet or packet header, a data structure value, pointer or index, or any other part or identification of a packet. Moreover, these packets may contain one or more types of information, including, but not limited to, voice, data, video, and audio information. The term "item" is used herein to refer to a packet or any other unit or piece of information or data. The phrases "processing a packet" and "packet processing" typically refer to performing some steps or actions based on the packet, and which may or may not include modifying and/or forwarding the packet.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may be performed in the same or in a different serial or parallel ordering and/or by different components and/or processes, threads, etc., and/or over different connections and be combined with other functions in other embodiments in keeping within the scope and spirit of the invention.

Moreover, the terms "network" and "communications mechanism" are used generically herein to describe one or more networks, communications mediums or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc.

The term "storage mechanism" includes any type of memory, storage device or other mechanism for maintaining instructions or data in any format. "Computer-readable medium" is an extensible term including any memory, storage device, storage mechanism, and other storage and signaling mechanisms including interfaces and devices such as network interface cards and buffers therein, as well as any communications devices and signals received and transmitted, and other current and evolving technologies that a computerized system can interpret, receive, and/or transmit. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic. The term "data structure" is an extensible term referring to any data element, variable, data structure, data base, and/or one or more or an organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc. The term "associative memory" refers to all types of known or future developed associative memories, including, but not limited to binary and ternary content-addressable memories, hash tables, TRIE and other data structures, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before the another, but rather provides a mechanism to distinguish between particular units. Additionally, the use of a singular tense of a noun is non-limiting, with its use typically including one or more of the particular item rather than just one (e.g., the use of the word "memory" typically refers to one or more memories without having to specify "memory or memories," or "one or more memories" or "at least one memory", etc.) Moreover, the phrases "based on x" and "in response to x" are used to indicate a minimum set of items x from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modify or not modifying the coupled signal or communicated information. The term "subset" is used to indicate a group of all or less than all of the elements of a set. Moreover, the term "or" is used herein to identify a selection of one or more, including all, of the conjunctive items.

Methods and apparatus are disclosed for processing packets in a router, packet switching system, or other communications or computer system. Such packet processing may include, for example, but is not limited to using a high performance massively parallel packet processing architecture, distributing packets or subsets thereof to individual packet processors and gathering the processed packet or subsets and forwarding the resultant modified or otherwise processed packets, accessing packet processing resources across a shared resource network, accessing packet processing resources using direct memory access techniques, and/or storing one overlapping portion of a packet in a global packet memory while providing a second overlapping portion to a packet processor.

In one embodiment, a packet belonging to one of multiple streams of packets is received. A next packet processor is determined based on a distribution pattern. A subset of bytes of the packet is distributed to the next packet processor. The subset of the packet is processed to generate a modified subset, which is gathered from the next packet processor in turn based on the distribution pattern; and a modified packet including the modified subset is forwarded. In one embodiment, the state of the processing is checked prior to gathering from a packet processing element. In one embodiment, the processing of a subset continues after it is gathered, such as in the case of a multicast packet, packet fragmentation, wiretapping or snooping (e.g., routing a copy to another location). In one embodiment, a packet processing element is skipped during a current gathering round. In one embodiment, whether to skip is determined based on an indication provided by the packet processing element. In one embodiment, the same number of skip operations are performed in the gathering of all packets belonging to a particular stream of packets. In one embodiment, a packet to be forwarded is derived from a gathered modified subset of a packet and a subset of the packet stored in a global packet memory. In one embodiment, the subset of the packet manipulated by a packet processing engine and the subset stored in a global packet memory contain overlapping portions of the original packet.

In one embodiment, the processing of the packet includes accessing one or more processing resources across a resource network shared by multiple packet processing engines. In one embodiment, the global packet memory is one of these resources. In one embodiment, these resources are accessed using direct memory access (DMA) techniques. In one embodiment, a packet processor can simultaneously have multiple DMA requests outstanding to the same or to different resources. In one embodiment, a descriptor used in a prior DMA request is modified and then used in a second DMA request.

FIG. 1A illustrates using one embodiment of ingress packet processors 101 and 102 connected to a switching fabric 103, which is connected to one embodiment of egress packet processors 104 and 105. In one embodiment, packet processors 101, 102, 104, and/or 105 correspond to one of the packet processors illustrated in FIGS. 2 and/or 3A and/or operates according to one of the flow diagrams illustrated in FIGS. 4, 5 and/or 6A.

Figure 1B:
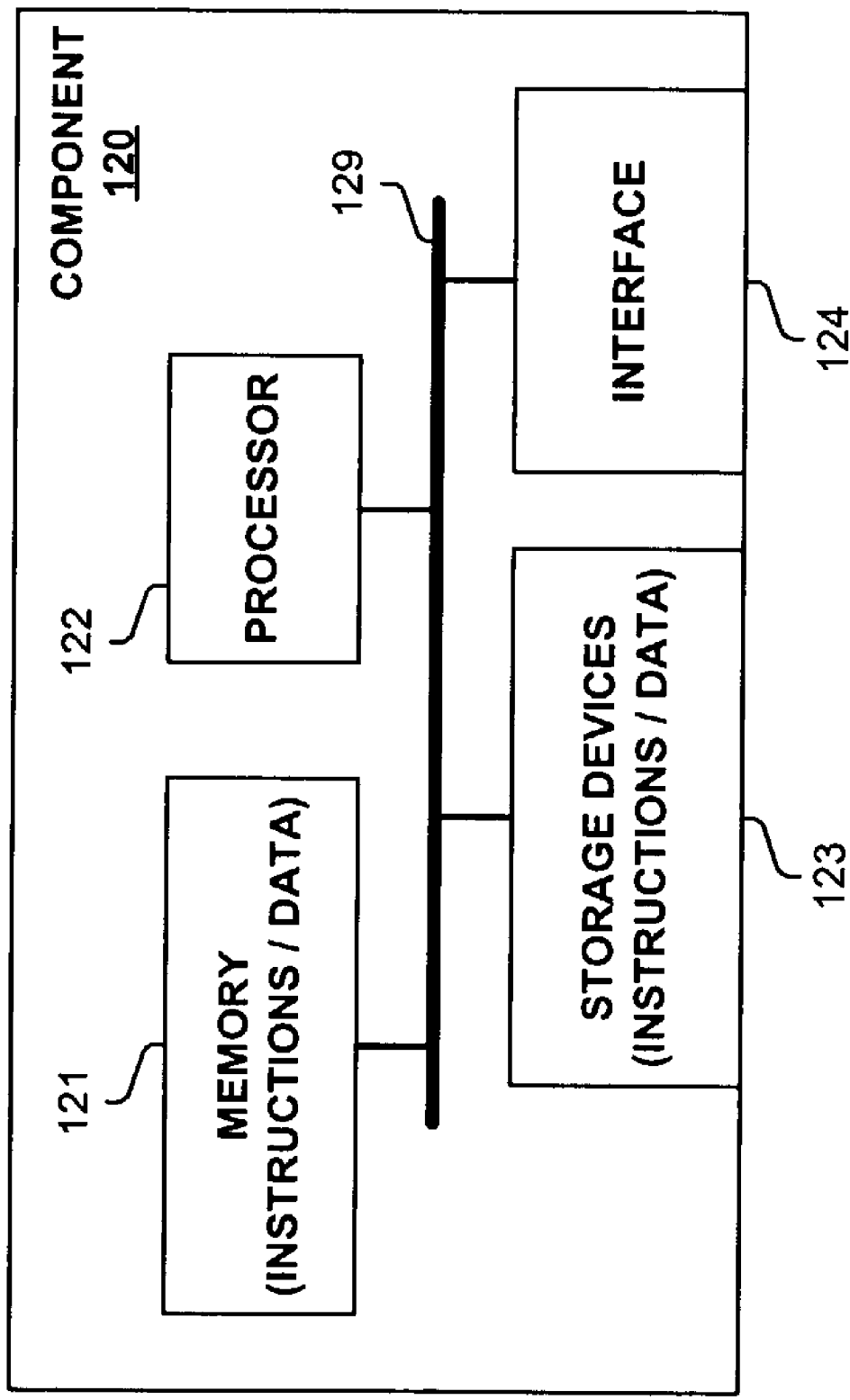
FIG. 1B is a block diagram of a component, such as, but not limited to a packet processor, distributor, gatherer, or resource used in one embodiment.

FIG. 1B illustrates a component 120. In one embodiment, component 120 corresponds to a packet processor operating according to one of the flow diagrams illustrated in FIGS. 4, 5 and/or 6A. In one embodiment, component 120 corresponds to a resource operating according to the flow diagrams illustrated in FIGS. 7A-B.

In one embodiment, component 120 includes a processor 121, memory 122, storage devices 123, and an external interface 124 for receiving and sending packets and other information, which are typically coupled via one or more communications mechanisms 129 (shown as a bus for illustrative purposes.) Various embodiments of component 120 may include more or less elements. The operation of component 120 is typically controlled by processor 121 using memory 122 and storage devices 123 to perform one or more scheduling tasks or processes. Memory 122 is one type of computer-readable medium, and typically comprises random access memory (RAM), read only memory (ROM), flash memory, integrated circuits, and/or other memory components. Memory 122 typically stores computer-executable instructions to be executed by processor 121 and/or data which is manipulated by processor 121 for implementing functionality in accordance with the invention. Storage devices 123 are another type of computer-readable medium, and typically comprise solid state storage media, disk drives, diskettes, networked services, tape drives, and other storage devices. Storage devices 123 typically store computer-executable instructions to be executed by processor 121 and/or data which is manipulated by processor 121 for implementing functionality in accordance with the invention.

Figure 2:
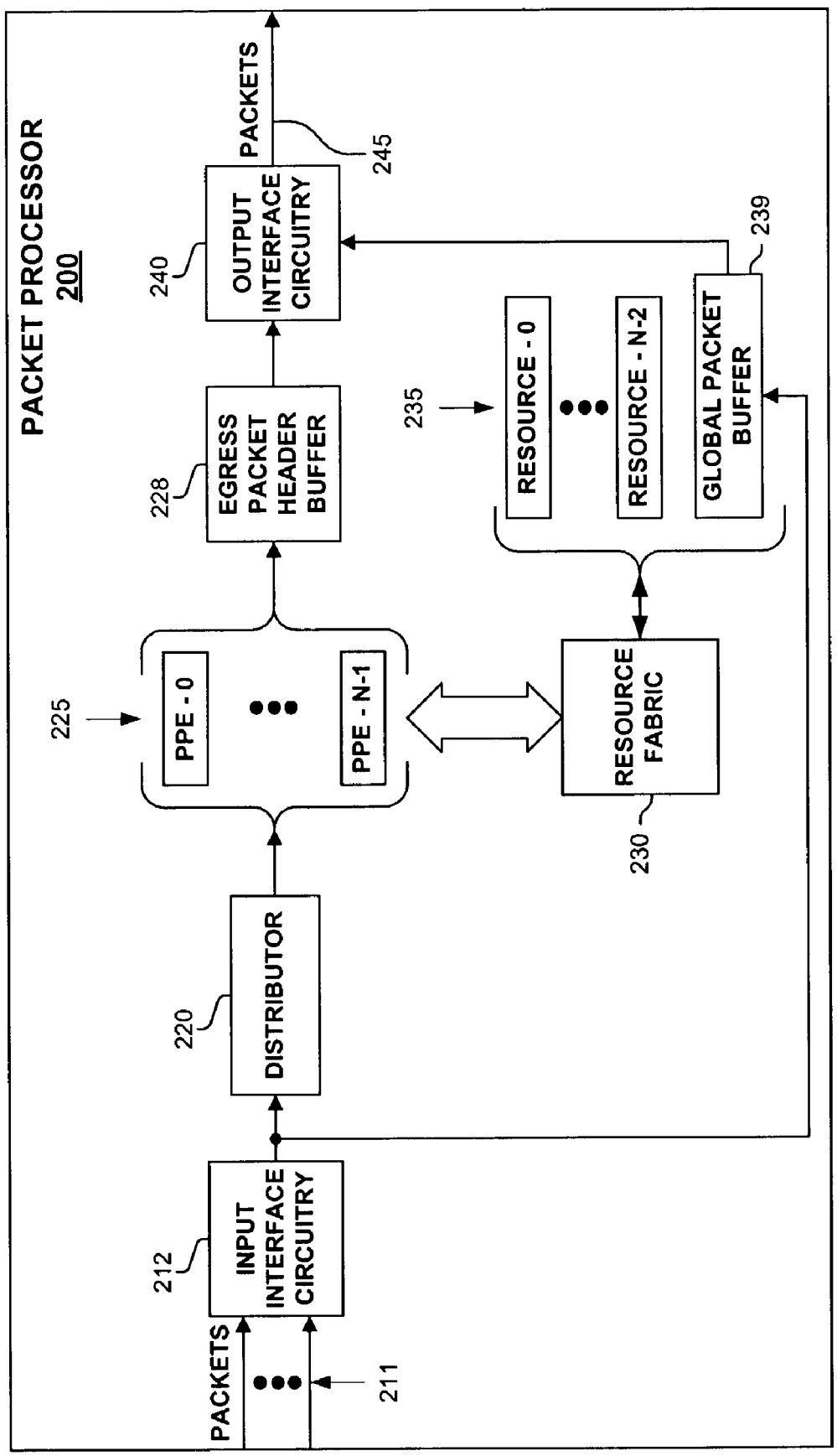
FIG. 2 is a block diagram of a packet processor used in one embodiment.

FIG. 2 illustrates one embodiment of a packet processor 200. Packets 211 are received by input interface circuitry 212. A first subset of bytes of a received packet is placed in global packet buffer 239. Typically, this first subset of bytes is not required for processing of the packet. However, as global packet buffer 239 is configured as a shared resource, any portion of the first subset can subsequently be retrieved by a packet processing engine.

A second subset of bytes of a received packet is forwarded to a distributor 220. The second subset includes the information contained in the received packet that is typically required for processing of the packet. In one embodiment, the first and second subset of bytes include overlapping portions of the received packet, which may be advantageous as a packet processing engine can overwrite a determined non-needed portion of the second subset of bytes, or deallocate a corresponding portion of memory. In one embodiment, this overlapping portion of bytes includes bytes which are not modified during packet processing, but their contents may be required for such processing. Thus, the packet processing engine may not need to forward any of the overlapping portion as during a gather phase these bytes will be included from the first subset when the modified packet is assembled during a gather and forwarding process.

Distributor 220 distributes a first subset of the packet to a next available packet processing engine 225 based on a deterministic or random distribution pattern. In one embodiment, a round-robin distribution pattern is used. In one embodiment using a random distribution pattern, a distribution order is tracked for use by a gathering element so that packet order is maintained, at least for packets belonging to a same stream. In one embodiment, a packet processing engine 225 may indicate a skip operation to distributor 220, so that the particular packet processing engine 225 is passed over during a current distribution round. In one embodiment, all packets belonging to a same packet stream cause each packet processing engine delivered one of these packets to generate the same number of skip operations to maintain the original order of the packets. In one embodiment, the original order is not maintained by the packet processor. In one embodiment, distributor 220 will wait, if necessary, for an identified next packet processing engine 225 to become ready before distributing it a packet or before moving on to a next packet processing engine 225.

As shown, packet processing engines 225 are connected via resource fabric 230 to a plurality of resources 235. In one embodiment, global packet buffer 239 is one of these resources 235. In one embodiment, resources 235 may include, inter alia, a resource routing unit, a policer, an associative memory, a traffic engineer, a statistics collector, and/or an authorization unit, etc. For example, a next hop address may be determined and returned to the requesting packet processing engine 225. In one embodiment, resources 235 are accessed by a packet processing engine using direct memory access (DMA) techniques.

After processing is completed, a modified second subset of a received packet is retrieved/received by egress packet header buffer 228, typically in a gathering pattern based on the distribution pattern, and is forwarded to output interface circuitry 240. The remaining portion of the original packet is retrieved/received from global packet buffer 239. Output interface circuitry 240 assembles and forwards the modified packet 245 to a next component or system. In one embodiment, a packet processing engine 225 may or may not become available to process a next packet, as it may continue to process its current data to generate an additional one or more packets, such as required by a multicast or snoop operation, or to perform some additional processing such a required by certain statistics operations.

Figure 3A:
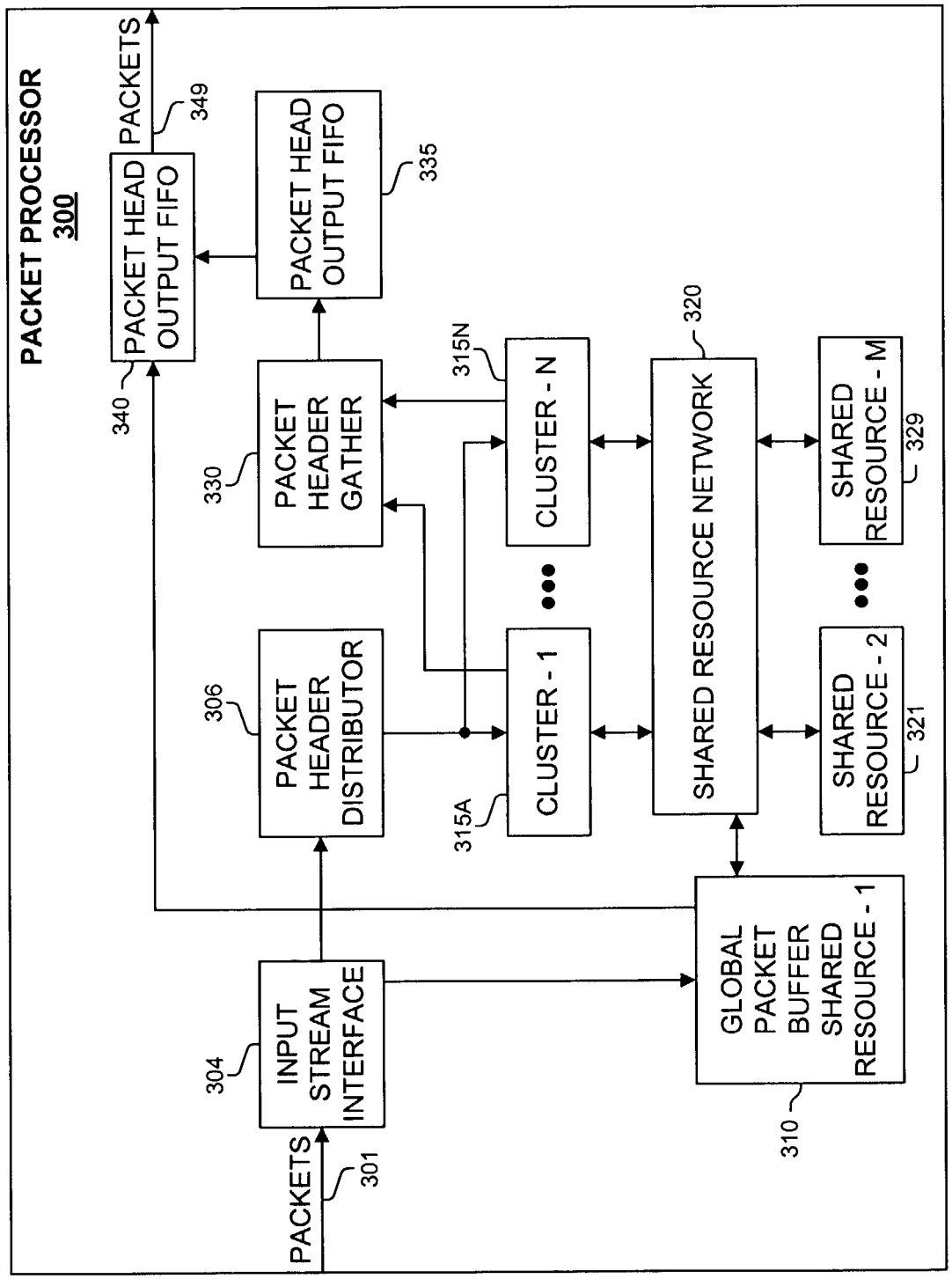
FIGS. 3A-C are block diagrams of a packet processor including a cluster and packet processing engine hierarchical architecture used in one embodiment.
Figure 3B:
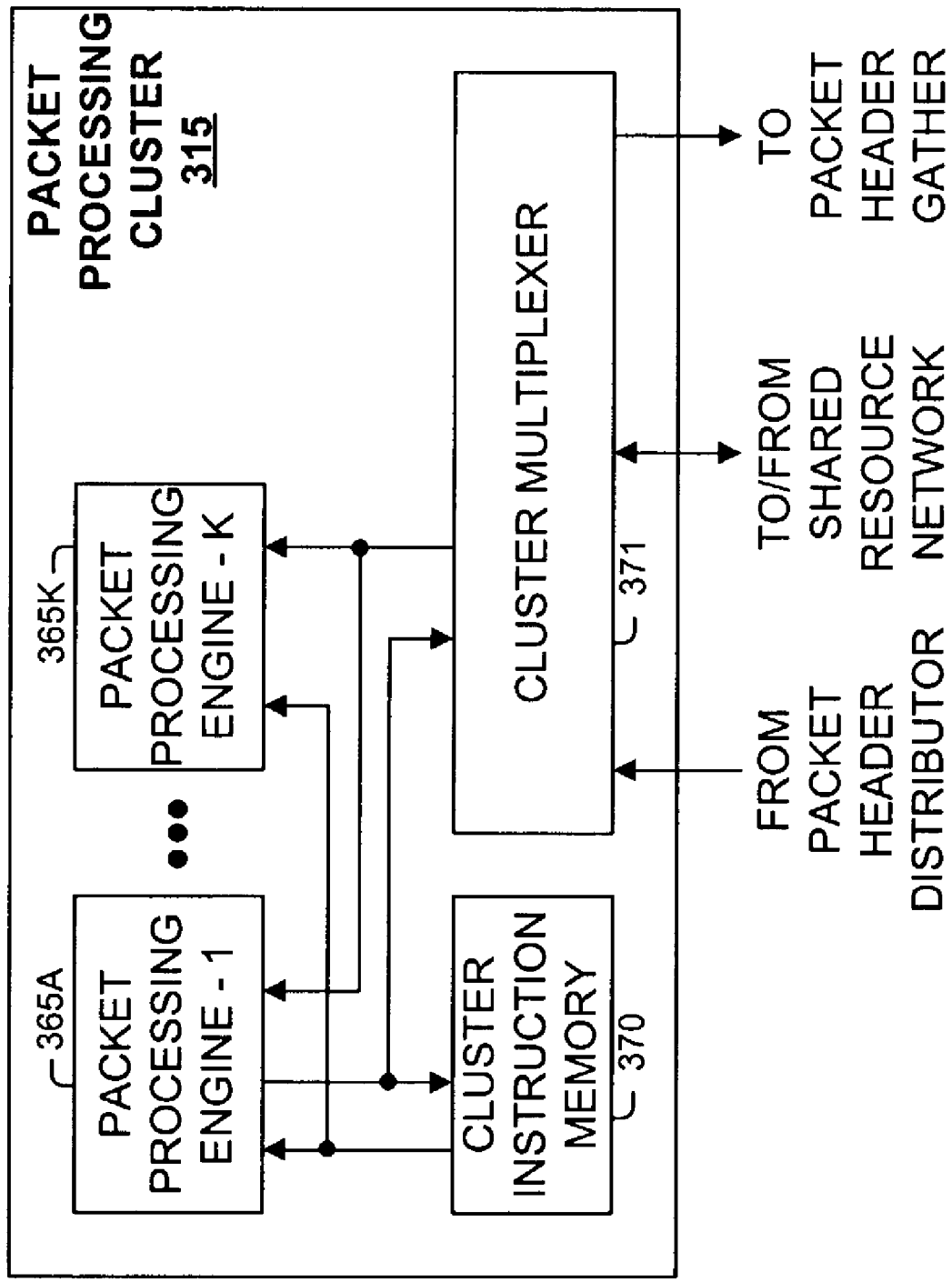
Figure 3C:
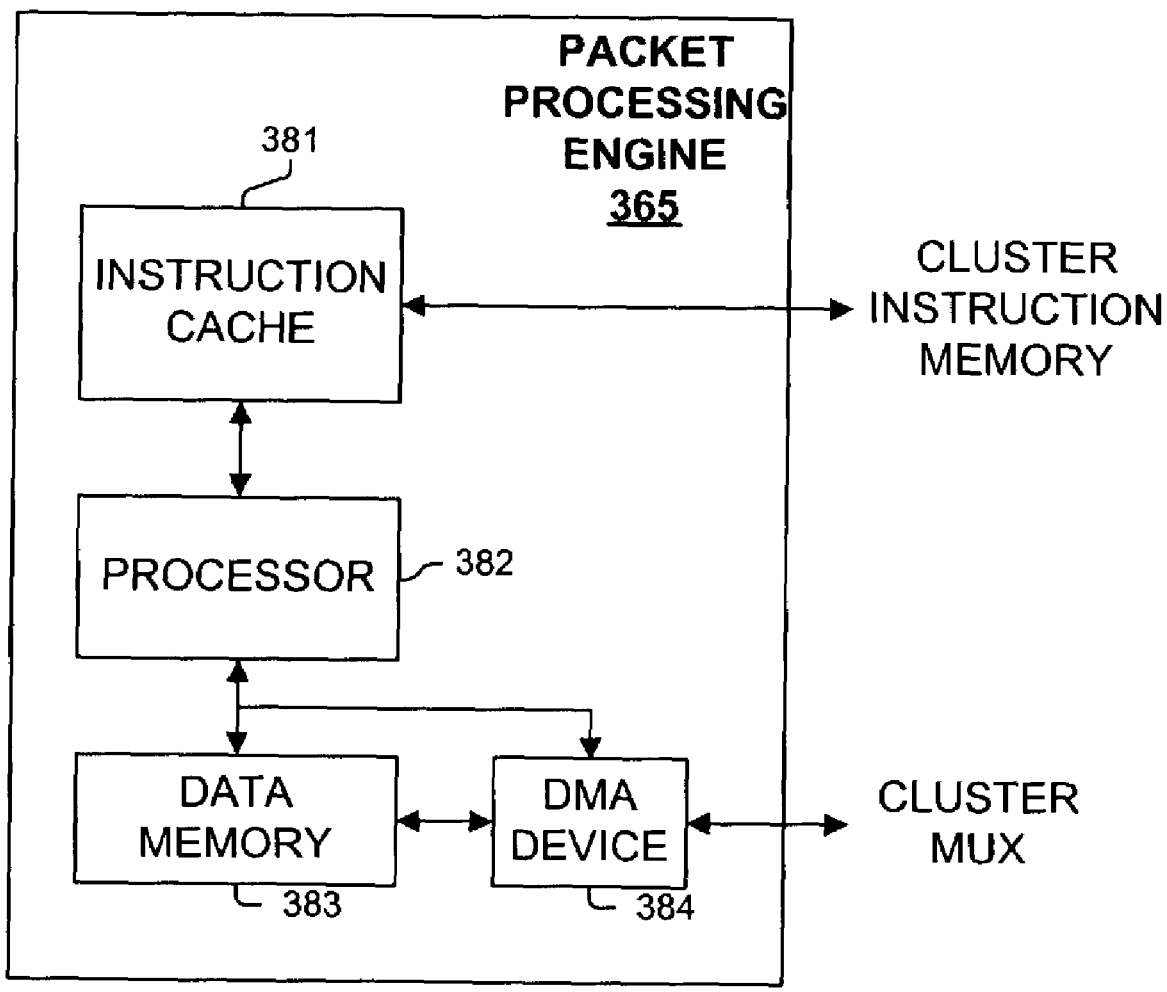

FIGS. 3A-3C illustrate a hierarchical packet processing architecture used in one embodiment. Turning to FIG. 3A, packets 301 are received into packet processor 300 by input stream interface 304, which distributes a first subset of the received packets to global packet buffer shared resource 310 and a second overlapping or non-overlapping subset of the received packet to packet header distributor 306, which distributes the second subset to one of the clusters 315A-N, possibly specifying a particular packet processing engine or leaving that distribution to the particular cluster. Elements within clusters 315A-N perform the packet processing, typically using one or more shared resources 310 and 321-329, which are accessed via shared resource network 320.

Modified second subsets of bytes of received packets are gathered from clusters 315A-315N by packet header gather 330, and are forwarded to packet head output FIFO 335. Modified packets 349 are sent from packet head output FIFO 340 after being assembled based on the first subset of bytes received from global packet buffer shared resource 310 and on the modified subset of bytes received from packet head output FIFO 335.

FIG. 3B illustrates a packet processing cluster 315 used in one embodiment. Cluster 315 typically includes multiple packet processing engines 365A-365K which share a common cluster instruction memory 370 and are connected to components and resources outside cluster 315 via cluster multiplexer 371.

FIG. 3C illustrates one embodiment of a packet processing engine 365. Processor 382, based on instructions provided by instruction cache 381, performs operations on the second subset of bytes of a received packet and/or other data or information stored in data memory 383. Data memory is one type of computer-readable medium. In one embodiment, packet processing engine 365 communicates with other components and/or resources via direct memory access (DMA) device 384, although any communication mechanism could be used.

Figure 4A:
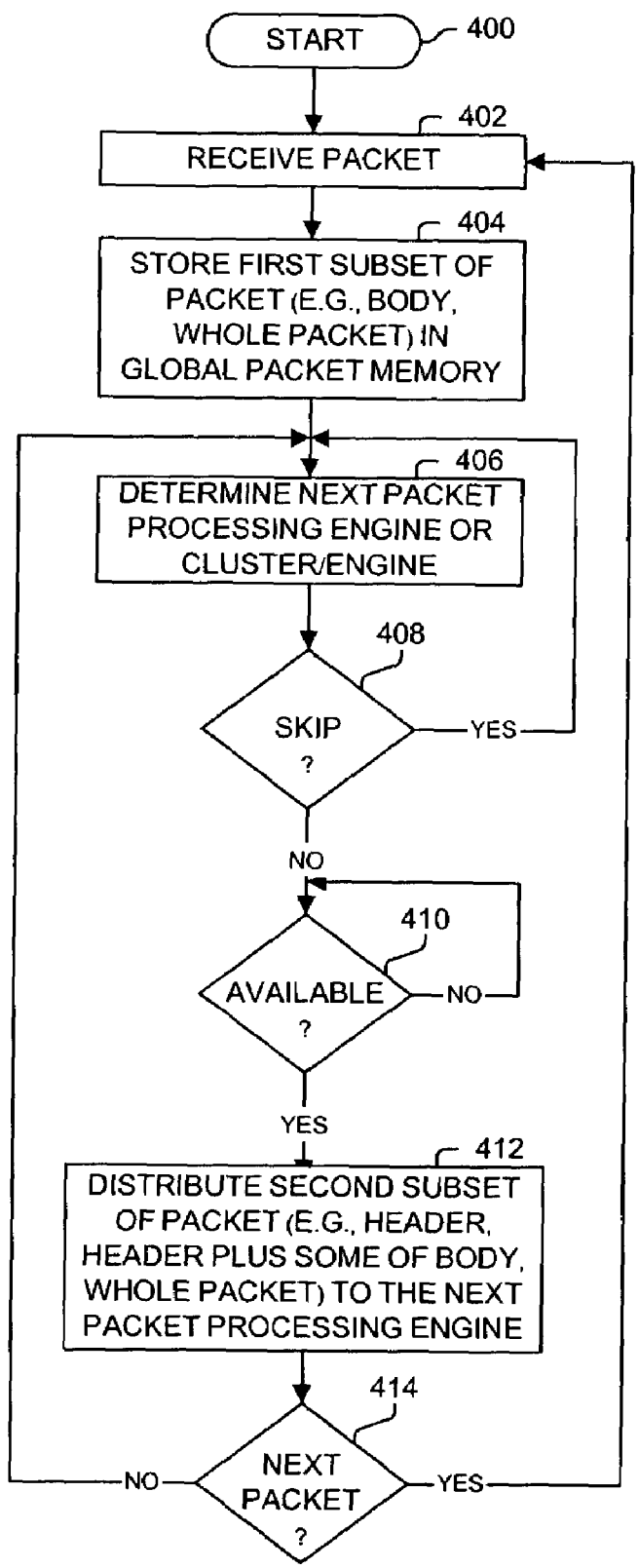
FIG. 4A illustrates a process for distributing subsets of packets to packet processing engines used in one embodiment.

FIG. 4A illustrates a process for distributing packets, or subsets thereof, used in one embodiment. Processing beings with process block 400, and proceeds to process block 402, wherein a packet is received. In process block 404, a first subset of the packet is stored in a global packet memory. Note, in keeping with the definition, this first subset could included the whole packet, the body of the packet, or any other portion or portions thereof. Next, in process block 406, a next packet processing engine (or cluster or both depending on the embodiment) is determined. As determined in process block 408, if the determined packet processing engine is to be skipped, then processing returns to process block 406 to identify a new next packet processing engine. Otherwise, when the processing engine is or becomes available as indicated by process block 410, then in process block 412, a second subset of the packet is distributed to the determined next packet processing engine. Note, in keeping with the definition, this second subset could included the whole packet, the header of the packet, or any other portion or portions thereof. Next, as determined in process block 414, if further distribution of the same packet is to be performed (e.g., to distribute the second subset of the packet to another packet processor, such as for processing in parallel multiple operations based on the packet), then processing returns to process block 406. Others, processing then to process block 402 to receive and distribute the next packet.

Figure 4B:
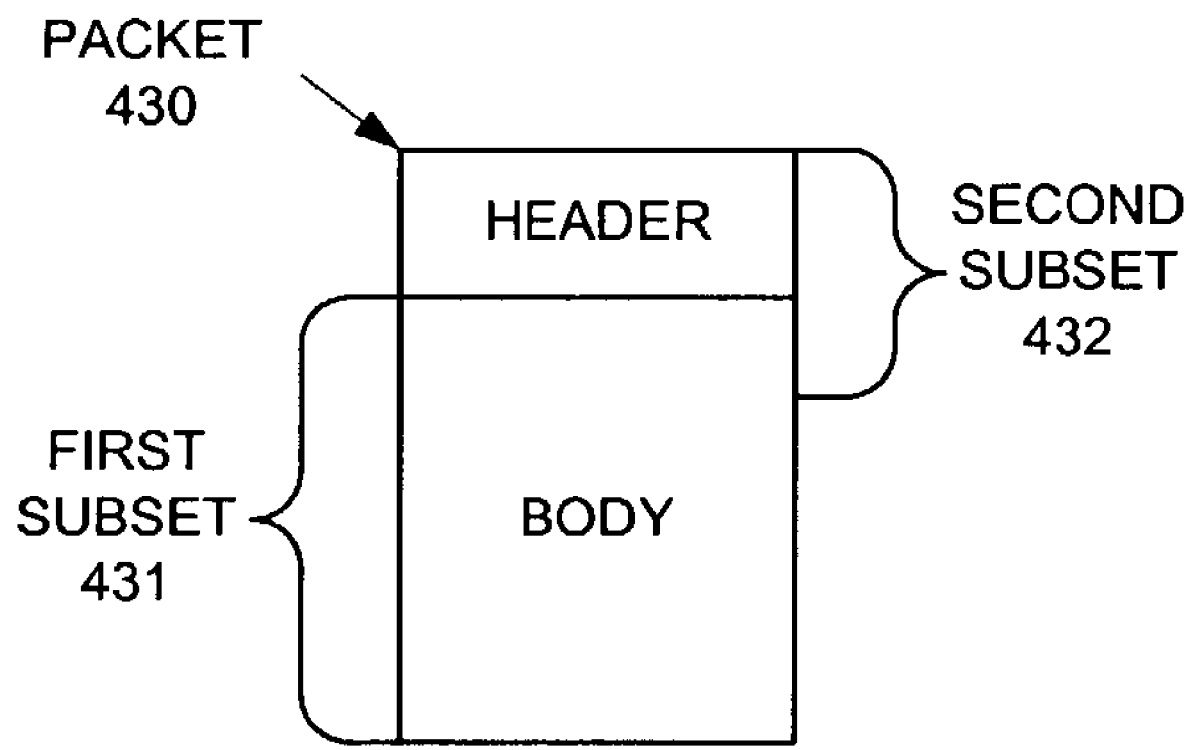
FIG. 4B illustrates a block diagram of first and second subsets of a packet used in one embodiment.

FIG. 4B illustrates a block diagram of a packet 430, and a first subset 431 and a second subset 432 derived there from as used in one embodiment. In one embodiment, first subset 431 and/or second subset 432 includes all of packet 430. In one embodiment, first subset 431 and second subset 432 include overlapping portions of packet 430. In one embodiment, first subset 431 and second subset 432 do not include overlapping portions of packet 430. In one embodiment, first subset 431 includes any contiguous or noncontiguous portion of packet 430. In one embodiment, second subset 432 includes any contiguous or noncontiguous portion of packet 430.

Figure 5:
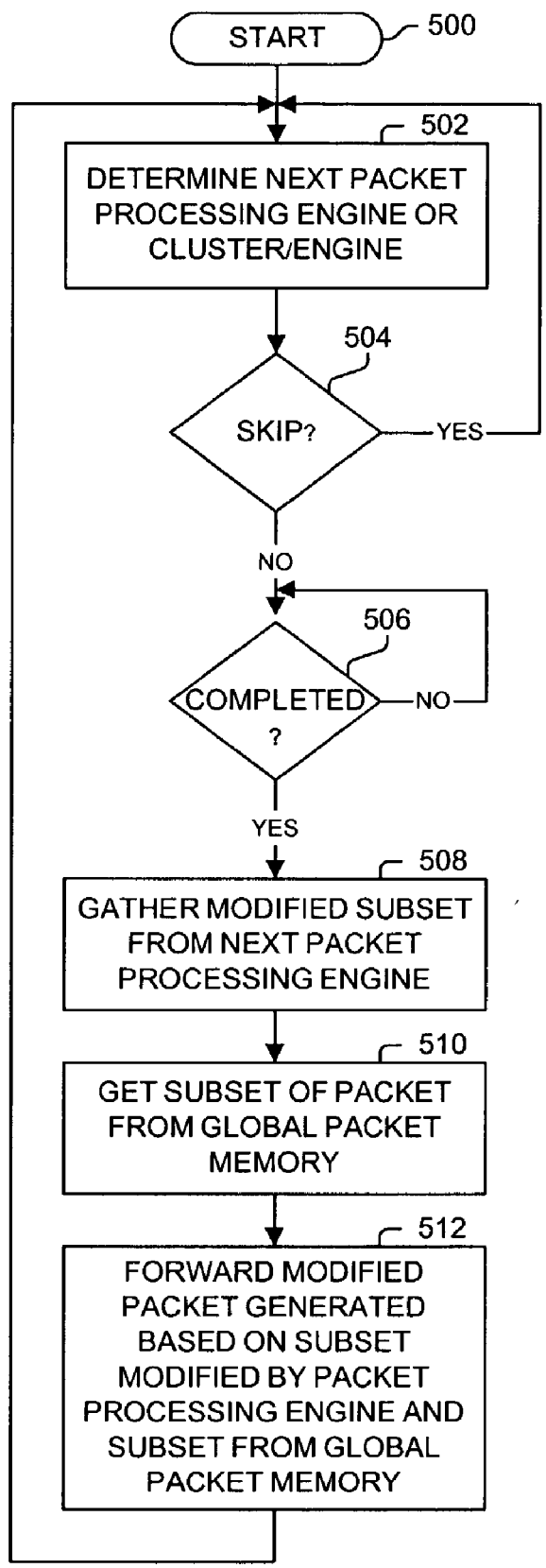
FIG. 5 illustrates a process for gathering packets from modified subsets of packets from packet processing engines used in one embodiment.

FIG. 5 illustrates a process for gathering processed packets or subsets thereof used in one embodiment. Processing begins with process block 500, and proceeds to process block 502, wherein a next packet processing engine is determined. As determined in process block 504, if a skip operation is indicated for the determined next packet processing engine, then processing returns to process block 502 to determine a new next packet processing engine. Otherwise, after the packet processing element has completed its processing as indicated by process block 506, then the modified (or unmodified) subset is gathered from the determined next packet processing engine. In process block 510, the first subset of the packet is retrieved/received from the global packet memory, and in process block 512, the modified packet is assembled and forwarded. Processing then returns to process block 502.

Figure 6A:
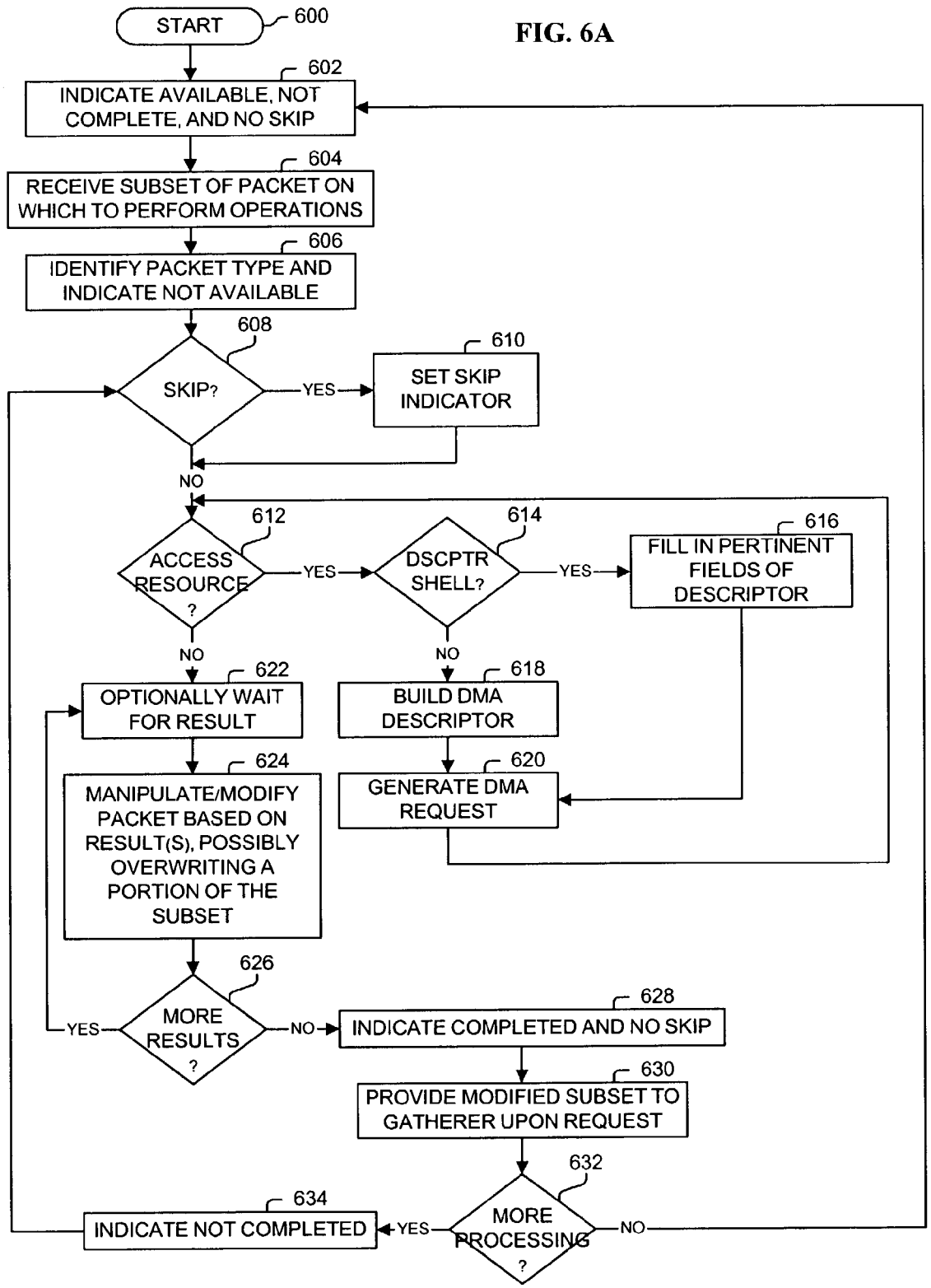
FIG. 6A illustrates a process for modifying subsets of packets used in one embodiment.

FIG. 6A illustrates a process for processing packets or subsets thereof used in one embodiment. Processing begins with process block 600, and proceeds to process block 602, wherein indicators are initialized that the packet processing engine is available to receive data, processing is not complete, and no skip operation. In process block 604, the subset of a packet is received. In process block 606, an indication that the packet processor is not available is set, and the type of packet is identified (e.g., what protocol or other processing is to be performed.) As determined in process block 608, if the type of packet corresponds to one requiring a skip operation, then in process block 610, a skip indicator is set.

Next, as determined in process block 612, if a resource needs to be accessed, then as determined in process block 614, if a direct memory access (DMA) descriptor shell already exists, then in process block 616, the pertinent (e.g., remaining, different, etc.) fields of the descriptor are filled; otherwise, in process block 618, the DMA descriptor is build in memory. In process block 620, a DMA request is generated. Processing returns to process block 612 to possibly send out more DMA requests. Note, multiple DMA requests can be outstanding at a same time.

Otherwise, processing proceeds to process block 622 to optionally wait for some results from a DMA request or to receive some other data needed for processing. Then, in process block 624, the packet is manipulated and/or modified as required for the processing to be performed on the packet or subset thereof. In one embodiment, a portion of the subset of the packet being manipulated and/or modified may be overwritten during this process. Next, as determined in process block 626, if there are more results expected, then processing returns to process block 622. Otherwise, in process block 628, the packet processing engine indicates that processing is complete and no skip operation is set. In process block 630, the modified packet or subset thereof is provided to the gatherer upon request or at the appropriate time. As determined in process block 632, if all processing is completed and a new packet or subset thereof is ready to be received, then processing returns to process block 602. Otherwise, in process block 634, the packet processing engine indicates that processing is not complete, and processing returns to process block 608.

Figure 6B:
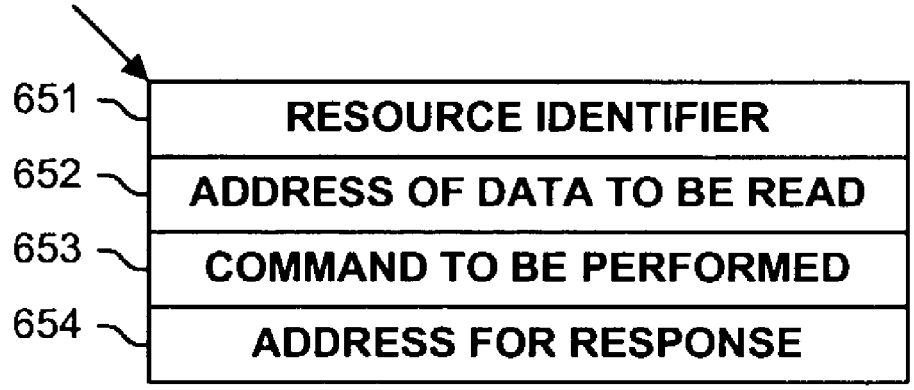
FIG. 6B illustrates block diagrams of an exemplary direct memory access (DMA) descriptor and an exemplary set of state indicators used in one embodiment.
Figure 6B:
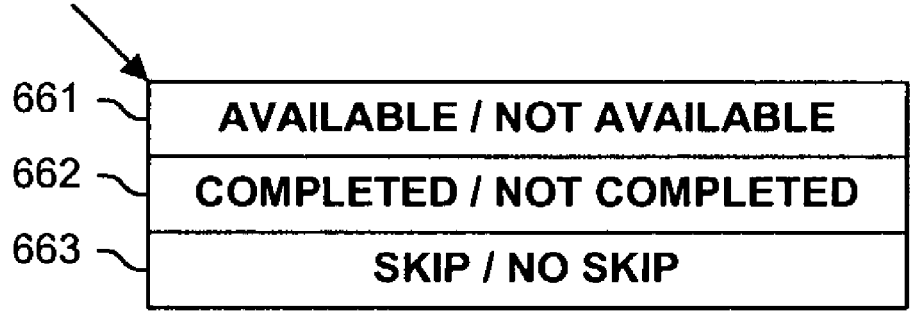

FIG. 6B illustrates an exemplary DMA descriptor 650 and exemplary indicators 660. In one embodiment, DMA descriptor includes, possibly with other fields, a resource identifier field 651, an address of the data to be read field 652, a command to be performed by the resource or other component field 653, and an address to place the returned response field 654. In one embodiment, indicators 660 used by a packet processing engine include an available/not available indicator 661, a completed/not completed indicator 662, and a skip/no skip indicator 663.

Figure 7A:
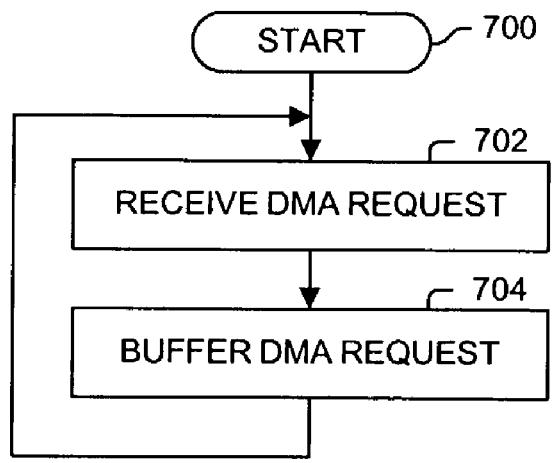
FIGS. 7A-B illustrate processes used by a resource in one embodiment.
Figure 7B:
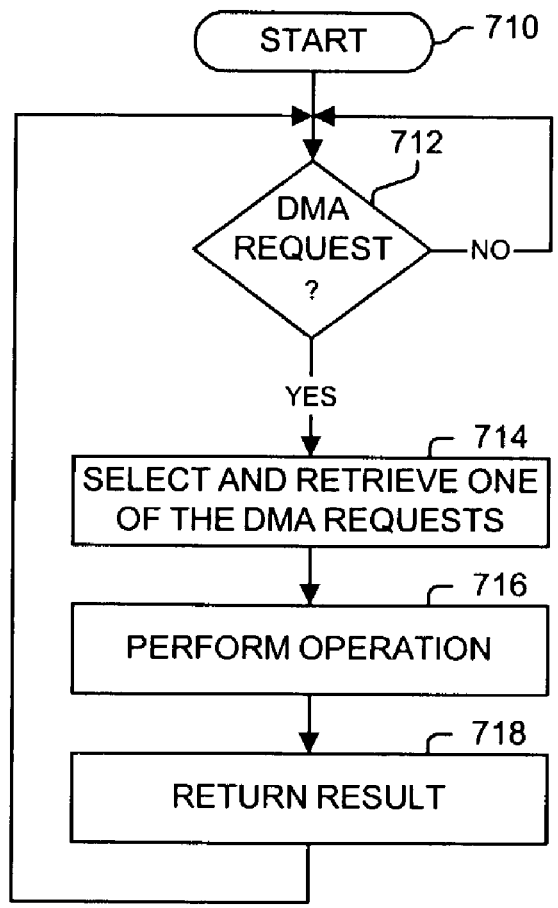

FIGS. 7A-B illustrate processes used by a resource in one embodiment. Turning to FIG. 7A, processing begins at process block 700, and proceeds to process block 702, wherein a DMA request is received. In process block 704, the DMA request is buffered. Processing then returns to process block 702. Turning to FIG. 7B, processing begins at process block 710, and proceeds to process block 712. If a DMA request is buffered, then in process block 714 one of the DMA requests is selected and retrieved. Next, in process block 716, the operation corresponding to the DMA request is performed. In process block 718, the result is returned, and processing returns to process block 712.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method for processing packets, the method comprising:
   for each packet of a plurality of packets of a plurality of ordered streams of packets:
      receiving said packet;
      determining a next packet processor of a plurality of packet processors based on a distribution pattern and the current availability of one or more of the plurality of packet processors, the distribution pattern being deterministic without regard to the contents of said packets;
      distributing a subset of bytes of said packet to the next packet processor; and
      processing the subset to generate a modified subset; and
   for each packet processor of the plurality of packet processors:
      determining a next gather packet processor of the plurality of packet processors based on the distribution pattern in order to maintain the original ordering of packets within each of the plurality of ordered streams of packets;
      gathering a generated modified subset of a particular packet from the next gather packet processor; and
      forwarding a modified packet including the generated modified subset.

2. The method of claim 1, wherein said determining the next gather packet processor includes identifying whether at least one packet processor has completed generating the modified subset.

3. The method of claim 2, wherein said identifying includes inspecting a skip or gather indication of said at least one packet processor.

4. The method of claim 2, wherein for each of the plurality of packet processors receiving the subset of bytes of one of the packets of a particular one of the plurality of ordered streams requiring at least one skip operation, generating a same number of skip or gather indications indicating a skip operation to maintain an original ordering of the plurality of packets of the particular one of the plurality of ordered streams.

5. The method of claim 1, wherein said determining the next packet processor includes inspecting an available signal from one or more of the plurality of packet processors.

6. The method of claim 1, wherein the distribution pattern is a round-robin among the plurality of packet processors.

7. An apparatus for processing packets, the apparatus comprising:
- a plurality of packet processing engines;
- a resource network coupled to each of the plurality of packet processing engines;
- a plurality of resources coupled to the resource network available to the plurality of packet processing engines for use in processing packets;
- a distributor for distributing packets among the plurality of packet processing engines based on a distribution pattern; and
- a gatherer for gathering packets from the plurality of packet processing engines based on the distribution pattern;
- wherein packet processing for each packet is performed by a single one of the plurality of packet processing engines;
- wherein the distributor is configured to distribute different packets of a plurality of streams of packets to a plurality of the plurality of packet processing engines, and the gatherer is configured to gather said packets of each of the plurality of streams of packets from the plurality of packet processing engines in a manner to guarantee that the original order of each of the plurality of streams of rackets is maintained.

8. The apparatus of 7, wherein the plurality of packet processing engines are grouped into a plurality of clusters.

9. The apparatus of claim 8, wherein each particular cluster of the plurality of clusters further includes a common cluster instruction memory coupled to each of the packet processing engines within said particular cluster.

10. The apparatus of claim 8, wherein each particular cluster of the plurality of clusters further includes a cluster multiplexer, coupled to each of the packet processing engines within said particular cluster, for interfacing the resource network.

11. The apparatus of claim 7, wherein the plurality of resources includes at least one of the group consisting of a routing unit; a policer, a traffic engineer, a statistics collector, and an authorization unit.

12. An apparatus for processing packets, the apparatus comprising:
- a plurality of packet processing engines;
- a resource network coupled to each of the plurality of packet processing engines;
- a plurality of resources coupled to the resource network;
- a distributor for distributing packets among the packet processing engines based on a distribution pattern; and
- a gatherer for gathering packets from the plurality of packet processing engines based on the distribution pattern;
- wherein packet processing for each packet is performed by a single one of the plurality of packet processing engines; and
- wherein each packet processing engine of the plurality of packet processing engines includes an instruction cache, a processor, a data memory, and a direct memory access (DMA) device for communicating with plurality of resources over the resource network.

13. The apparatus of claim 12, wherein the plurality of packet processing engines are grouped into a plurality of clusters; wherein each particular cluster of the plurality of clusters further includes a cluster multiplexer, coupled to each of the packet processing engines within said particular cluster, for interfacing the resource network.

14. An apparatus for processing packets, the apparatus comprising:
- a plurality of packet processing engines;
- a resource network coupled to each of the plurality of packet processing engines;
- a plurality of resources coupled to the resource network;
- a distributor for distributing packets among the packet processing engines based on a distribution pattern;
- a gatherer for gathering packets from the plurality of packet processing engines based on the distribution pattern; and
- a global packet memory, coupled to the distributor and gatherer, for storing a first subset of a received packet to be processed,
- wherein packet processing for each packet is performed by a single one of the plurality of packet processing engines; and
- wherein the distributor distributes a second subset of the received packet to one of the packet processing engines.

15. The apparatus of claim 14, wherein the plurality of resources includes the global packet memory.

16. The apparatus of claim 15, wherein the global packet memory is accessible via the resource network and a second input.

17. An apparatus for processing each packet of a plurality of packets of a plurality of ordered streams of packets, the apparatus comprising:
- means for receiving said packet;
- means for determining a next packet processor of a plurality of packet processors based on a distribution pattern and the current availability of one or more of the plurality of packet processors, the distribution pattern independent of the contents of said packets;
- means for distributing a subset of bytes of said packet to the next packet processor;
- means for processing the subset to generate a modified subset;
- means for determining a next gather packet processor of the plurality of packet processors based on the distribution pattern in order to maintain the original ordering of packets within each of the plurality of ordered streams of packets;
- means for gathering a generated modified subset of a particular packet from the next gather packet processor; and
- means for forwarding a modified packet including the generated modified subset.

18. The apparatus of claim 17, wherein said means for determining the next gather packet processor includes means for identifying whether at least one packet processor has completed generating the modified subset.

19. The apparatus of claim 17, wherein the distribution pattern is deterministic.

20. The apparatus of claim 19, wherein the distribution pattern is a round-robin among the plurality of packet processors.

21. A method for processing packets, the method comprising:
- receiving a packet of a plurality of streams of packets;
- determining a next packet processor of a plurality of packet processors based on a distribution pattern;
- distributing a subset of bytes of the packet to the next packet processor;
- tracking the distribution pattern to the plurality of packet processors;
- processing the subset to generate a modified subset;
- gathering the modified subset from the next packet processor in turn based on the distribution pattern; and forwarding a modified packet including the modified subset;

where said gathering the modified subset from the next packet processor in turn based on the distribution pattern is performed based on said tracking of the distribution pattern.

22. A method for processing packets, the method comprising:

receiving a packet of a plurality of streams of packets;

determining a next packet processor of a plurality of packet processors based on a distribution pattern;

distributing a subset of bytes of the packet to the next packet processor;

processing the subset to generate a modified subset;

gathering the modified subset from the next packet processor in turn based on the distribution pattern; and forwarding a modified packet including the modified subset;

wherein the packet is in a particular stream of the plurality of streams of packets; wherein other packets of the particular stream of packets are processed packet processors other than the next packet processor; and wherein said gathering and forwarding operations are performed in a manner to guarantee that the original order of said packets in the particular stream of packets is maintained by said forwarding operation.

23. A method for processing packets, the method comprising:

receiving a packet of a plurality of streams of packets;

determining a next packet processor of a plurality of packet processors based on a distribution pattern;

distributing a subset of bytes of the packet to the next packet processor;

processing the subset to generate a modified subset;

gathering the modified subset from the next packet processor in turn based on the distribution pattern; and forwarding a modified packet including the modified subset;

wherein the packet is in a particular stream of the plurality of streams of packets; wherein other packets of the particular stream of packets are processed packet processors other than the next packet processor; and wherein said gathering operation is performed in a manner to guarantee that the order of the stream of packets is maintained.

24. The method of claim 23, including: in response to determining that said processing the subset of the packet is not complete, skipping the next packet processor (currently processing the subset of bytes of the packet) whose turn it was according to the distribution pattern to perform said gathering the modified subset operation, and performing said gathering the modified subset operation the next time it is the next processor's turn according to the distribution pattern.

25. The method of claim 24, wherein said determining identifies said processing as not complete when the packet is of a first type and identifies said processing as complete when the packet is of a second type.

26. The method of claim 25, wherein the first and second types corresponds to different protocols.

27. The method of claim 23, further comprising:

processing, after said gathering the modified subset, the subset or modified subset to generate a second modified subset;

gathering the second modified subset from the next packet processor in turn based on the distribution pattern; and forwarding a second modified packet including the second modified subset.

28. The method of claim 27, wherein the packet is a multicast packet.

29. The method of claim 28, further comprising:

processing the subset, modified subset, or second modified subset to generate a third modified subset;

gathering the third modified subset from the next packet processor in turn based on the distribution pattern; and forwarding a third modified packet including the third modified subset.

30. The method of claim 27, wherein a set of fragmented packets of the packet include the modified packet and the second modified packet.

31. The method of claim 27, wherein the packet includes a set of data fields; and each of the modified packet and the second modified packet include the set of data fields.

32. The method of claim 23, further comprising storing a second subset of bytes of the packet in a second memory; and retrieving the second subset of bytes of the packet from the second memory; wherein the modified packet includes the second subset of the bytes of the packet.

33. The method of claim 32, wherein the second memory is a global packet memory shared by each of the plurality of packet processors.

34. A method for processing packets, the method comprising:

for each packet of a plurality of packets of a plurality of ordered streams of packets:

receiving said packet;

determining a next packet processor of a plurality of packet processors based on a distribution pattern and the current availability of one or more of the plurality of packet processors;

distributing a subset of bytes of said packet to the next packet processor; and processing the subset to generate a modified subset; and for each packet processor of the plurality of packet processors:

determining a next gather packet processor of the plurality of packet processors based on the distribution pattern;

gathering a generated modified subset of a particular packet from the next gather packet processor; and forwarding a modified packet including the generated modified subset;

wherein said determining the next gather packet processor includes identifying whether at least one packet processor has completed generating the modified subset; and wherein for each of the plurality of packet processors receiving the subset of bytes of one of the packets of a particular one of the plurality of ordered streams requiring at least one skip operation, generating a same number of skip or gather indications indicating a skip operation to maintain an original ordering of the plurality of packets of the particular one of the plurality of ordered streams.

* * * * *

UNITED STATES PATENT AND TRADEMARK OFFICE
CERTIFICATE OF CORRECTION

PATENT NO. : 7,304,999 B2 Page 1 of 1
APPLICATION NO. : 10/227119
DATED : December 4, 2007
INVENTOR(S) : Sukonik et al.

It is certified that error appears in the above-identified patent and that said Letters Patent is hereby corrected as shown below:

Col. 11, line 25, replace "rackets" with -- packets --

Col. 11, line 26, replace "of 7" with -- of claim 7 --

Signed and Sealed this

Third Day of November, 2009

David J. Kappos
*Director of the United States Patent and Trademark Office*